US011809561B2

(12) United States Patent
Lee et al.

(10) Patent No.: US 11,809,561 B2
(45) Date of Patent: Nov. 7, 2023

(54) SYSTEM AND METHOD FOR IDENTIFYING COMPROMISED ELECTRONIC CONTROLLER USING INTENTIONALLY INDUCED ERROR

(71) Applicants: Hyundai Motor Company, Seoul (KR); Kia Corporation, Seoul (KR); Korea University Research and Business Foundation, Seoul (KR)

(72) Inventors: Dong Hoon Lee, Seoul (KR); Wonsuk Choi, Seoul (KR); Kyungho Joo, Seoul (KR); Seyoung Lee, Seoul (KR); Aram Cho, Incheon (KR)

(73) Assignees: Hyundai Motor Company, Seoul (KR); Kia Corporation, Seoul (KR); Korea University Research and Business Foundation, Seoul (KR)

( * ) Notice: Subject to any disclaimer, the term of this patent is extended or adjusted under 35 U.S.C. 154(b) by 287 days.

(21) Appl. No.: 17/230,199

(22) Filed: Apr. 14, 2021

(65) Prior Publication Data
US 2022/0035916 A1 Feb. 3, 2022

(30) Foreign Application Priority Data

Jul. 29, 2020 (KR) .................. 10-2020-0094193
Jan. 4, 2021 (KR) .................. 10-2021-0000237

(51) Int. Cl.
*G06F 21/00* (2013.01)
*G06F 21/56* (2013.01)
*H04L 12/40* (2006.01)

(52) U.S. Cl.
CPC ...... *G06F 21/566* (2013.01); *H04L 12/40013* (2013.01); *G06F 2221/034* (2013.01);
(Continued)

(58) Field of Classification Search
CPC . H04L 63/1425; H04L 63/1441; H04L 12/40; H04L 12/40013; H04L 2012/40273;
(Continued)

(56) References Cited

U.S. PATENT DOCUMENTS

2017/0286675 A1   10/2017   Shin et al.
2018/0337934 A1   11/2018   Huth et al.
(Continued)

FOREIGN PATENT DOCUMENTS

CN   111262846 A    6/2020
KR   101669946 B1   10/2016
(Continued)

OTHER PUBLICATIONS

Extended European Search Report issued in European Application No. 21176220.8, dated Sep. 9, 2021, 9 pages.

*Primary Examiner* — Tri M Tran
(74) *Attorney, Agent, or Firm* — Fox Rothschild LLP

(57) ABSTRACT

A system and method for identifying a compromised controller using an intentional error are provided. The method, performed by an electronic device in a controller area network (CAN), for identifying a compromised electronic control unit (ECU) that transmits an attack message on a CAN bus in a periodic transmission cycle. The method includes, in response to detecting the attack message, transitioning a first ECU among a plurality of ECUs connected to the CAN bus to a bus-off state intentionally, and determining whether the first ECU is the compromised ECU based at least in part on a time, which is predicted from recovery parameters related to the first ECU, for when the first ECU resumes transmission of a CAN message and a time when the attack message is redetected on the CAN bus.

10 Claims, 11 Drawing Sheets

(52) U.S. Cl.
CPC .............. *H04L 2012/40215* (2013.01); *H04L 2012/40273* (2013.01)

(58) Field of Classification Search
CPC ......... H04L 2012/40215; G06F 21/566; G06F 2221/034
See application file for complete search history.

(56) References Cited

U.S. PATENT DOCUMENTS

2019/0260772 A1\* 8/2019 Juliato .............. H04L 12/40136
2021/0203682 A1\* 7/2021 Bajpai .................... G06F 21/55

FOREIGN PATENT DOCUMENTS

| KR | 20200076217 A | 6/2020 |
|----|---------------|--------|
| WO | 2019035112 A1 | 2/2019 |

\* cited by examiner

SYSTEM AND METHOD FOR IDENTIFYING COMPROMISED ELECTRONIC CONTROLLER USING INTENTIONALLY INDUCED ERROR

CROSS-REFERENCE TO RELATED APPLICATIONS

The present application is based on, and claims priority from, Korean Patent Application Number 10-2020-0094193, filed Jul. 29, 2020, and Korean Patent Application Number 10-2021-0000237, filed Jan. 4, 2021, the disclosures of which are incorporated by reference herein in their entireties.

TECHNICAL FIELD

The present disclosure relates to identifying a compromised controller in an in-vehicle network.

BACKGROUND

The statements in this section merely provide background information related to the present disclosure and do not necessarily constitute prior art. Providing vehicles with more and more software modules and external interfaces invites new attacks and vulnerability around in-vehicle networks. To detect or prevent vehicle cyber-attacks, various types of security solutions are proposed for in-vehicle networks, and focused researches have been actively conducted on an Intrusion Detection System (IDS) for detecting attacks across Controller Area Network (CAN) which are used as de facto standards for in-vehicle networks.

In one type of spoofing attack, an attacker takes control of one of the Electronic Control Units (ECUs) and can use a counterfeited or compromised ECU to pretend to be another one of the ECUs by broadcasting messages seemingly generated by the another one of the ECUs over the network. Once IDS detects a CAN security attack, to get a restoration, for example, to have the normal patch or update of the compromised ECU used in the spoofing attack is premised on the identification of the compromised ECU.

Developed related art includes a technology for identifying an ECU by using the characteristics of a power signal flowing through a CAN bus when the ECU transmits a message. This technology requires additional high-performance hardware to measure the power signal and susceptible to the vulnerability of the power signal as being sensitive to changes in external elements such as temperature, electromagnetic field, and model year.

Additional related art discloses a technology for identifying an ECU by using physical properties of the ECU, such as the clock skew of a CAN message transmitted on a CAN bus. This technique is difficult to accurately identify the compromised ECU when it emulates the clock skew of another ECU. The year 2016 saw a report of a bus-off attack as a new Denial of Service (DoS) attack on the CAN bus. In a bus-off attack, the attacker uses the CAN protocol's fault confinement mechanisms to transition the target ECU to a bus-off state, making it impossible to send and receive messages.

SUMMARY

According to at least one aspect, the present disclosure provides a method, performed by an electronic device in a controller area network (CAN), for identifying a compromised electronic control unit (ECU) that transmits an attack message on a CAN bus in a periodic transmission cycle, including in response to detecting the attack message, transitioning a first ECU among a plurality of ECUs connected to the CAN bus to a bus-off state intentionally, and determining whether the first ECU is the compromised ECU based at least in part on a time, which is predicted from recovery parameters related to the first ECU, for when the first ECU resumes a transmission of a CAN message and a time when the attack message is redetected on the CAN bus.

According to another aspect, the present disclosure provides a method, performed by an electronic device in a controller area network (CAN), for analyzing recovery parameters related to a recovery of an electronic control unit (ECU), connected to a CAN bus, from a bus-off state, including transitioning the ECU that periodically transmits a controller area network message (CAN message) to the bus-off state intentionally, and monitoring the CAN bus to receive the CAN message that is resumed to be transmitted following the recovery of the ECU from the bus-off state, and analyzing the recovery parameters of the ECU based in part on a time when the CAN message is received.

According to yet another aspect, the present disclosure provides an electronic device for identifying a compromised electronic control unit (ECU) that transmits an attack message on a controller area network bus (CAN bus) in a periodic transmission cycle, the electronic device including an error generating unit and a compromised-ECU identification unit. The error generating unit is configured to, in response to detecting the attack message, transition a first ECU among a plurality of ECUs connected to the CAN bus to a bus-off state intentionally. The compromised-ECU identification unit is configured to determine whether the first ECU is the compromised ECU based at least in part on a time, which is predicted from recovery parameters related to the first ECU, for when the first ECU resumes a transmission of a CAN message and a time when the attack message is redetected on the CAN bus.

According to yet another aspect, the present disclosure provides an electronic device for analyzing recovery parameters related to a recovery of an electronic control unit (ECU), connected to a controller area network bus (CAN bus), from a bus-off state, the electronic device including an error generating unit and a parameter analysis unit. The error generating unit is configured to transition the ECU that periodically transmits a controller area network message (CAN message) to the bus-off state intentionally. The parameter analysis unit is configured to monitor the CAN bus to receive the CAN message that is resumed to be transmitted following the recovery of the ECU from the bus-off state, and to analyze the recovery parameters of the ECU based in part on a time when the CAN message is received.

BRIEF DESCRIPTION OF THE DRAWINGS

The objects, features and advantages of the present disclosure will be more apparent from the following detailed description in conjunction with the accompanying drawings, in which.

REFERENCE NUMERALS

Figure 1:
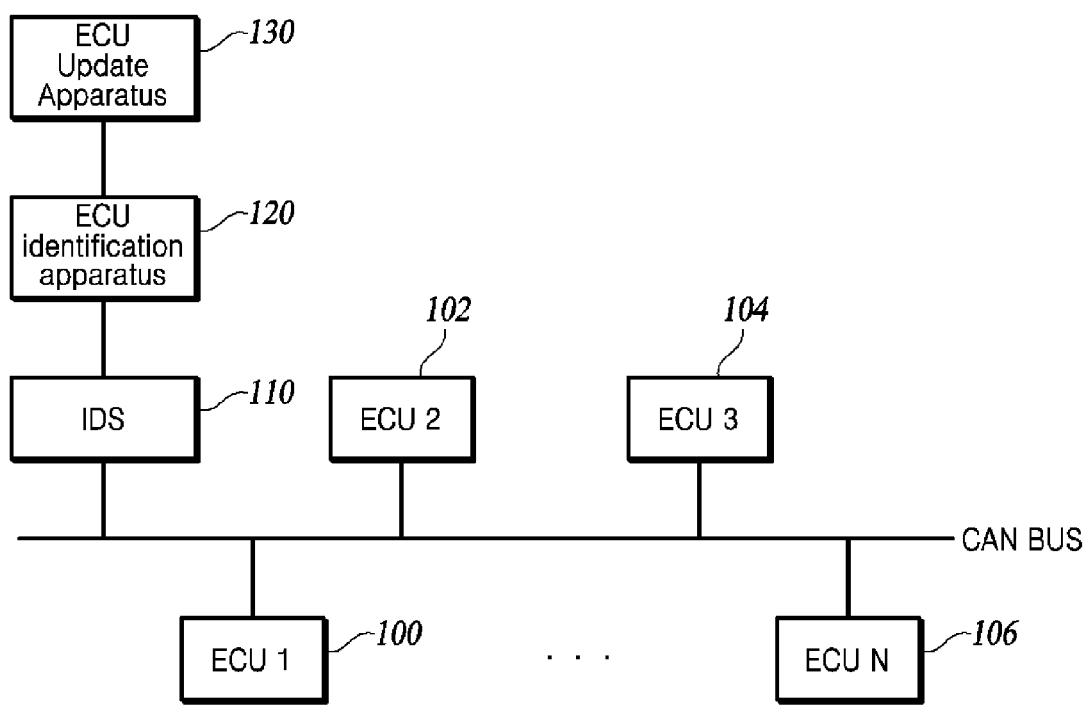
FIG. 1 is a block diagram schematically showing a CAN (Controller Area Network) system according to at least one exemplary embodiment of the present disclosure.

10: CAN system
100 to 106: ECU
110: IDS
120: ECU identification apparatus
130: ECU update apparatus
200: error generating unit
210: parameter analysis unit
220: parameter storage unit
230: calculation unit
240: compromised-ECU identification unit

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Some exemplary embodiments of the present disclosure provide methods and systems for identifying a compromised controller being used for an attack on a CAN network by using fault confinement mechanisms of the CAN protocol.

Hereinafter, some exemplary embodiments of the present disclosure will be described in detail with reference to the accompanying drawings. In the following description, like reference numerals preferably designate like elements, although the elements are shown in different drawings.

Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Before describing various exemplary embodiments of the present disclosure, fault confinement mechanisms of the Controller Area Network Protocol (CAN protocol) will be discussed.

Each ECU (Electronic Control Unit) connected on the CAN bus has a Transmit Error Count (TEC) and Receive Error Count (REC) that increase or decrease with a specific weight according to the success of message transmission or reception or occurrence of an error. The state of the ECU is defined based on TEC and REC. In particular, when the TEC is equal to or greater than 256, the ECU transitions to a state in which it cannot transmit and receive any messages on the CAN bus. This state is referred to as a bus-off state.

On the other hand, the return of the ECU from the bus-off state back to the active state capable of participating in CAN communications is referred to as recovery. The ECU may recover from the bus-off state by monitoring 128 consecutive 11 recessive bits. In an actual operating environment, an additional time of tens to hundreds of milliseconds is required for each ECU.

Based on such fault confinement mechanisms as above, some exemplary embodiments of the present disclosure provide a method and system for forcibly transitioning the ECU to the bus-off state and using the characteristics appearing in the recovery process to identify the ECU.

FIG. 1 is a block diagram schematically showing a CAN system according to at least one exemplary embodiment of the present disclosure. As shown in FIG. 1, the CAN system 10 according to at least one exemplary embodiment may include all or some of at least one of ECUs 100 to 106, an Intrusion Detection System (IDS) 110, an ECU identification apparatus 120, and an ECU update apparatus 130. Not all blocks shown in FIG. 1 are essential components, and some blocks included in the CAN system 10 may be added, changed, or deleted in other exemplary embodiments. In other words, the example configuration of FIG. 1 is illustrative of the CAN system 10 according to at least one exemplary embodiment with components for the function of identifying a compromised ECU, and it should be appreciated that the CAN system 10 may have configurations of more or fewer components or other components than those illustrated to implement other functions. The ECUs 100 to 106 are electronic devices having a CAN communication function and are configured to transmit an ordinary CAN message and/or an attack CAN message on a CAN bus in a periodic transmission cycle.

The IDS 110 may be configured to detect an attack that occurred on the CAN bus. In response to detecting an attack on the CAN bus, the IDS 110 may be configured to transmit identification initiation information to the ECU identification apparatus 120. In particular, the identification initiation information may include the IDentification (ID) of the attack CAN message and/or the transmission period of the attack CAN message.

The ECU identification device 120 may be a separate electronic device accessible to the CAN bus, or may be included as a functional module in an electronic device implementing the IDS 110. The ECU identification apparatus 120 may be configured to analyze and store the recovery parameters corresponding to the respective ECUs 100 to 106, and identify the ECU using the recovery parameters. According to at least one exemplary embodiment of the present disclosure, the ECU identification apparatus 120 may be configured to analyze and store recovery parameters corresponding to the respective ECUs 100 to 106 before the IDS 110 detects an attack. In response to the IDS 110 detecting an attack and transmitting the identification initiation information to the ECU identification apparatus 120, the latter utilizes the recovery parameters to identify the compromised ECU that performs the attack.

Meanwhile, according to another exemplary embodiment of the present disclosure, the ECU identification apparatus 120 may be configured to receive and store recovery parameters corresponding to the respective ECUs 100 to 106 from an externally connected ECU analysis apparatus (not shown). A detailed description of the ECU identification apparatus 120 will be presented with reference to FIG. 2.

The ECU update apparatus 130 may be configured to restore the compromised ECU to a normal ECU by performing an update of the compromised ECU identified by the ECU identification apparatus 120. the IDS or the ECU update apparatus in the present disclosure encompasses all IDSs or ECU update apparatus that may be easily employed by a person skilled in the art, and the IDS or the ECU update apparatus is not limited to having a specific configuration and/or function.

Figure 2:
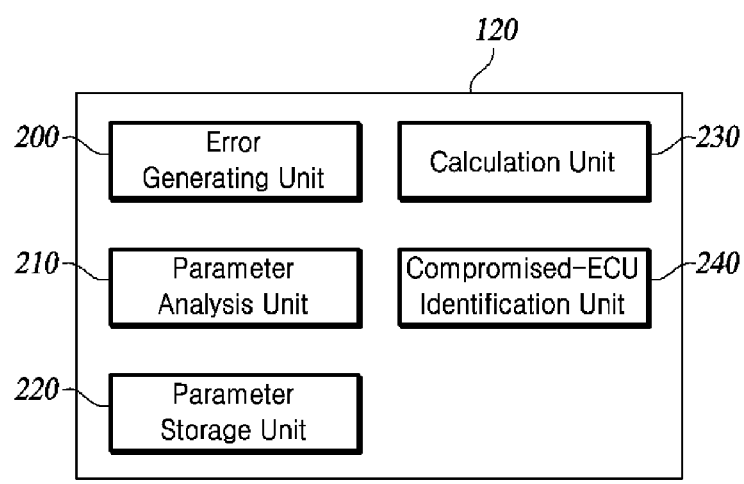
FIG. 2 is a block diagram schematically showing an ECU (Electronic Control Unit) identification apparatus according to at least one exemplary embodiment of the present disclosure.

FIG. 2 is a block diagram schematically showing an ECU identification apparatus according to at least one exemplary embodiment of the present disclosure. As shown in FIG. 2, the ECU identification apparatus 120 according to at least one exemplary embodiment may include all or some of an error generating unit 200, a parameter analysis unit 210, a parameter storage unit 220, a calculation unit 230, and the compromised-ECU identification unit 240. Not all blocks shown in FIG. 2 are essential components, and some blocks included in the ECU identification apparatus 120 may be added, changed, or deleted in other embodiments. For example, the ECU identification apparatus 120 may not include the parameter analysis unit 210 if it receives recovery parameters from its interworked ECU analysis apparatus that is a separate stand-alone apparatus. In particular, the ECU analysis apparatus may include all or some of the error generation unit 200 and the parameter analysis unit 210. The error generating unit 200 causes an error on the CAN bus to transition the ECU to the bus-off state.

According to at least one exemplary embodiment of the present disclosure, the error generating unit 200 may transition the target ECU to a bus-off state using an ECU diagnosis protocol. In particular, the target ECU refers to an analysis target ECU for which recovery parameters are analyzed or an identification target ECU to be checked whether it is identified as a compromised ECU.

Figure 3:
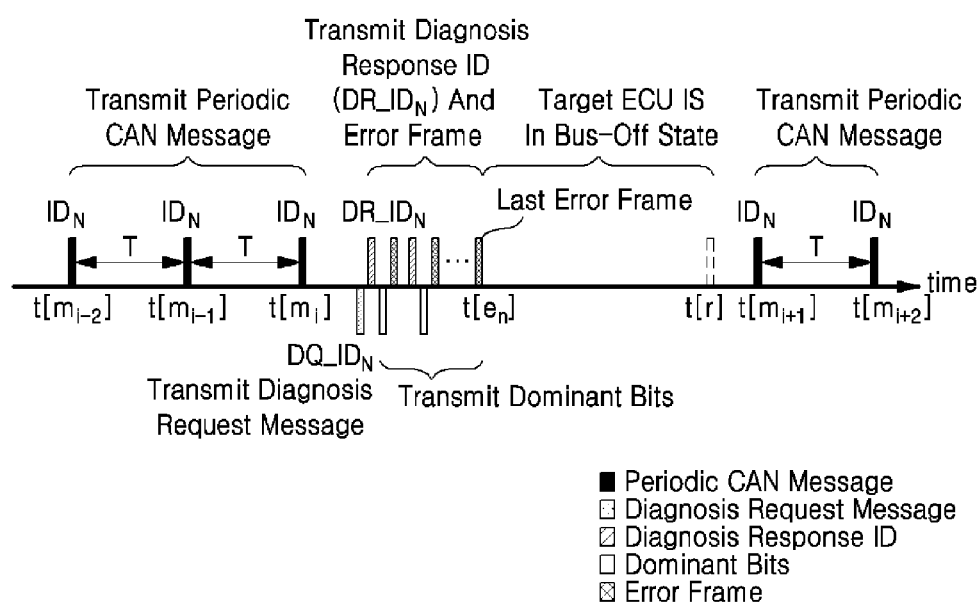
FIG. 3 is a diagram illustrating a method of transitioning an ECU to a bus-off state according to at least one exemplary embodiment of the present disclosure.

FIG. 3 is a diagram illustrating a method of transitioning an ECU to a bus-off state according to at least one exemplary embodiment of the present disclosure. In the CAN system, a diagnosis request ID and a diagnosis response ID are defined, corresponding to each ECU. For example, a diagnosis request ID and a diagnosis response ID may be defined in a range of 0x700 or more. In FIG. 3, $DQ\_ID_N$ and $DR\_ID_N$ respectively denote a diagnosis request ID and a diagnosis response ID corresponding to the target ECU transmitting an CAN message on a CAN bus in a periodic transmission cycle. Additionally, $ID_N$ and T respectively denote the ID and the period of the CAN message. As shown in FIG. 3, in response to the error generating unit 200 transmitting on a CAN bus a diagnosis request message including a diagnosis request ID ($DQ\_ID_N$), the target ECU may be configured to transmit on the CAN bus a diagnosis response message including a diagnosis response ID ($DR\_ID_N$).

The error generating unit 200 according to at least one exemplary embodiment may be configured to transmit the diagnosis request message corresponding to the target ECU, monitor the CAN bus to detect the initiation of transmission of the diagnosis response message by the target ECU, and in response to a detection of the initiation of transmission of the diagnosis response message by the target ECU, transmit a plurality of dominant bits on the CAN bus, causing a transmission error to occur in the diagnosis response message of the target ECU. For example, the error generating unit 200 is responsive to a detection of the diagnosis response ID corresponding to the target ECU, for transmitting six consecutive dominant bits on the CAN bus. Accordingly, the target ECU may be configured to detect a bit error, and the target ECU fails to transmit a diagnosis response message. The target ECU may be configured to transmit the error frame message on the CAN bus, increase the TEC (Transmit Error Count) and retransmit the diagnosis response message.

The error generating unit 200 according to at least one exemplary embodiment is responsive to a detection of the retransmitted diagnosis response ID, for retransmitting a plurality of dominant bits on the CAN bus. The error generating unit 200 may be configured to monitor the CAN bus to detect the transmission of an error frame message and the initiation of transmission of a diagnosis response message of the target ECU. The error generating unit 200 may be configured to transmit a plurality of dominant bits on the CAN bus in response to detecting the initiation of transmission of the diagnosis response message of the target ECU, thereby increasing the TEC of the target ECU to transition the target ECU to the bus-off state.

The error generating unit 200 may be configured to determine the time ($t[e_n]$) at which the last error frame message is transmitted on the CAN bus as the time at which the target ECU transitions to the bus-off state. On the other hand, the error generating unit 200 using the above-described ECU diagnosis protocol is merely one exemplary embodiment of the technique for transitioning the target ECU to the bus-off state, and as long as a technique may be employed in other exemplary embodiments of the present disclosure by those skilled in this art for transitioning the target ECU to the bus-off state, it may be used in place of the error generating unit 200.

The parameter analysis unit 210 may be configured to analyze recovery parameters related to the inherent characteristics of the analysis target ECU when the latter recovers from the bus-off state. Specifically, the parameter analysis unit 210 may be configured to monitor the CAN bus to receive the CAN message that is resumed to be transmitted following the recovery of the analysis target ECU from the bus-off state, and to analyze the recovery parameters of the analysis target ECU based in part on a time when the CAN message is received.

Hereinafter, before describing the method of the parameter analysis unit 210 analyzing recovery parameters, the recovery parameters defined in some exemplary embodiments of the present disclosure will be described. FIGS. 4A to 4D are diagrams for illustrating the recovery parameters according to at least one exemplary embodiment of the present disclosure. In the present disclosure, three recovery parameters of a Wait Time, a Controller Recovery Type, and a Timer Behavior are defined to analyze inherent characteristics that appear in the ECU in the process of resuming CAN message transmission after recovery from the bus-off state.

Figure 4A:
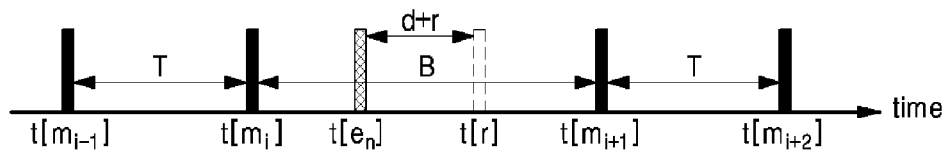
FIGS. 4A to 4D are diagrams for illustrating recovery parameters according to at least one exemplary embodiment of the present disclosure.

In FIGS. 4A to 4D, $t[m_i]$ denotes the time when the ECU transmits the last CAN message before it transitions to the bus-off state, $t[e_n]$ denotes the time when the ECU transitions to a bus-off state, $t[r]$ denotes the time when the ECU recovers from the bus-off state, and $t[m_{i+1}]$ denotes the time when the ECU transmits the first CAN message after it recovers from the bus-off state. As shown in FIG. 4A, d+r denotes the difference between $t[r]$ and $t[e_n]$. Herein d is Wait Time and r is a variable representing Controller Recovery Type.

Wait Time is a waiting time for the ECU to perform recovery after detecting that it has transitioned to the bus-off state. Wait Time may be set to a specific time or a specific number of interruptions. For example, the ECU may be configured to perform recovery after waiting for about 60 to 70 ms after detecting the bus-off state. Alternatively, the ECU may be configured to perform recovery after waiting for 7 interruptions from the time when it last transmitted the CAN message before transitioning to the bus-off state.

Controller Recovery Type is a parameter that defines the time at which the CAN controller inside the ECU monitors 128 consecutive 11 recessive bits to perform recovery, and it is classified as Immediate recovery or Wait-then-recovery. When Controller Recovery Type is Immediate recovery, r has a value of 0 (zero), and when Controller Recovery Type is Wait-then-recovery, r has a value greater than 0.

When Controller Recovery Type is Immediate recovery, the CAN controller may be configured to monitor 128 consecutive 11 recessive bits immediately upon detection of a bus-off state. In other words, the CAN controller may be configured to monitor during Wait Time and perform recovery immediately after Wait Time. On the other hand, when Controller Recovery Type is Wait-then-recovery, the CAN controller may be configured to first wait for Wait Time, monitor 128 consecutive 11 recessive bits, and perform recovery.

Timer Behavior is a parameter that defines how an ECU internal timer, which is provided for periodically transmitting CAN messages, operates during a bus-off state and recovery, and it is classified into Initialized Timer, Suspended Timer, and Alive Timer.

Figure 4B:
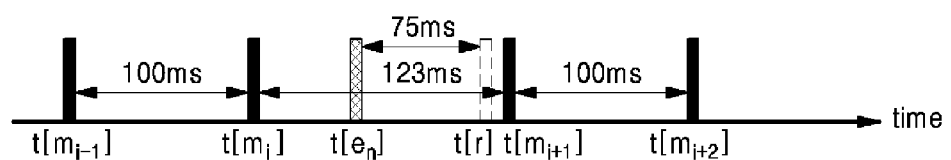

As shown in FIG. 4B, when Timer Behavior is an Initialized Timer, the ECU may be configured to initialize the timer as it recovers from the bus-off state. As a result, a message transmission interrupt occurs and the ECU resumes CAN message transmission immediately after recovery regardless of the CAN message transmission period.

Figure 4C:
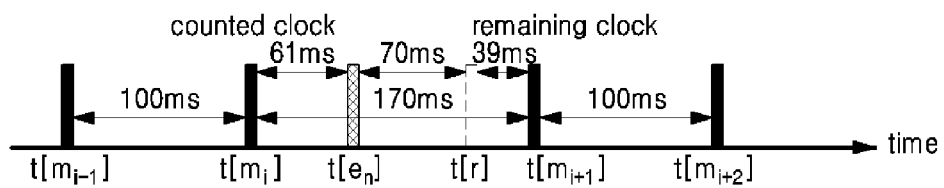

As shown in FIG. 4C, when Timer Behavior is a Suspended Timer, the ECU may be configured to stop the timer as it detects a bus-off state, and count the timer again after recovery. The timer may be stopped before the ECU recovers from the bus-off state, so no message transmission interrupt occurs.

Figure 4D:
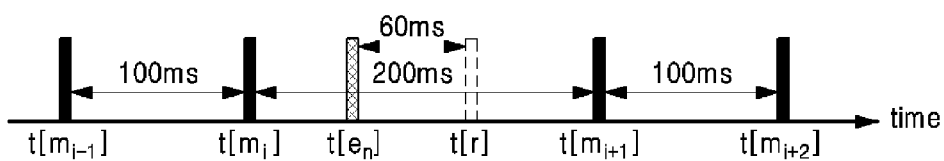

As shown in FIG. 4D, when Timer Behavior is Alive Timer, the timer operates regardless of bus-off transition and recovery of the ECU and generates a message transmission interrupt in the same manner as in a normal state. The ECU may be configured to ignore the message transmission interrupt that occurs when it is in the bus-off state.

The parameter analysis unit 210 according to at least one exemplary embodiment of the present disclosure may be configured to analyze Wait Time and Controller Recovery Type of the analysis target ECU based on the time ($t[m_{i+1}]$) at which the analysis target ECU resumes transmission of an ordinary CAN message and the time ($t[e_n]$) at which the analysis target ECU transitions to a bus-off state.

Specifically, the parameter analysis unit 210 may be configured to analyze Wait Time and Controller Recovery Type of the analysis target ECU by using time-1 ($t[m_{i+1}]$-$t[e_n]$) and time-2 ($t[m_{i+1}]$-$t[e_n]$-$t_{AR}$) wherein time-1 is the difference between the time ($t[m_{i+1}]$) at which the analysis target ECU resumes transmission of the ordinary CAN message and the time ($t[e_n]$) at which the analysis target ECU transitions to the bus-off state, and time-2 equals to time-1 ($t[m_{i+1}]$-$t[e_n]$) minus the time ($t_{AR}$) taken for monitoring 128 consecutive 11 bits.

The parameter analysis unit 210 may be configured to monitor a plurality of analysis units each being defined by a set of bus-off, recovery, and message retransmission of the analysis target ECU. The parameter analysis unit 210 may be configured to calculate time-1 and time-2 based on $t[e_n]$, $t[m_{i+1}]$, and $t_{AR}$ measured for each analysis unit. The parameter analysis unit 210 may be configured to determine Wait Time and Controller Recovery Type of the analysis target ECU by comparing the distribution of time-1 values and the distribution of time-2 values. For example, in response to determining that the variance (or standard deviation, hereinafter the same) of time-1 values is less than the variance of time-2 values, the parameter analysis unit 210 may be configured to determine that Controller Recovery Type is Immediate recovery. On the other hand, in response to determining that the variance of time-1 values is greater than the variance of time-2 values, the parameter analysis unit 210 may be configured to determine that Controller Recovery Type is Wait-then-recovery. Additionally, the parameter analysis unit 210 may be configured to determine an average of values having a smaller variance among time-1 and time-2 values as the Wait Time.

The parameter analysis unit 210 according to at least one exemplary embodiment may find out Timer Behavior of the analysis target ECU using the CAN message transmission period (T) and the CAN message transmission interval (B) before and after bus off. Table 1 shows Timer Behavior according to the relationship between the CAN message transmission period (T) and the CAN message transmission interval (B) before and after bus-off.

TABLE 1

| Relationship between T and B | Timer Behavior |
| --- | --- |
| d + r ≤ B ≤ T + d + r | Initialized |
| B = T + d + r | Suspended |
| B = n · T, (n = Natural Number) | Alive |

The parameter analysis unit 210 may be configured to map the analyzed recovery parameter with the diagnosis request ID and the diagnosis response ID of the analysis target ECU and store the mapping results in the parameter storage unit 220.

The calculation unit 230 may be configured to calculate a time for the identification of the compromised ECU by using the recovery parameters stored in the parameter storage unit 220.

According to at least one exemplary embodiment of the present disclosure, the calculation unit 230 calculates a retransmission time when to resume the transmission of the attack CAN message. In other words, assuming that the identification target ECU is a compromised ECU that transmits an attack CAN message, the calculation unit 230 may be configured to calculate a time at which the identification target ECU recovers from the bus-off state and resume transmission of the attack CAN message. The calculation unit 230 may be configured to calculate the retransmission time ($t[m_{new}]$) by using at least one of the time ($t[e_n]$) when the identification target ECU transitioned to the bus-off state, the time ($t[m_i]$) when the last attack CAN message transmitted before the identification target ECU transitioned to the bus-off state, and the recovery parameters.

Table 2 shows the calculated retransmission time ($t[m_{new}]$) according to Timer Behavior of the identification target ECU.

TABLE 2

| Timer Behavior | $t[m_{new}]$ |
|---|---|
| Initialized | $t[m_{new}] = t[e_n] + d + r$ |
| Suspended | $t[m_{new}] = t[m_i] + T + d + r$ |
| Alive | $t[m_{new}] = t[m_i] + n \cdot T$, ($t[m_i] + n \cdot T > t[r]$) |

According to another exemplary embodiment of the present disclosure, the calculation unit 230 calculates a recovery time at which the identification target ECU recovers from the bus-off state. For example, as shown in FIG. 4A, the calculation unit 230 may be configured to calculate the recovery time by using the time ($t[e_n]$) at which the identification target ECU transitions to the bus-off state, Wait Time, and Controller Recovery Type.

The compromised-ECU identification unit 240 uses may be configured to use at least one of the retransmission time and the recovery time, which are calculated by the calculation unit 230, and the first attack CAN message transmission time ($t[m_{i+1}]$) after the identification target ECU transitions to the bus-off state to determine whether the identification target ECU is a compromised ECU.

Figure 5A:
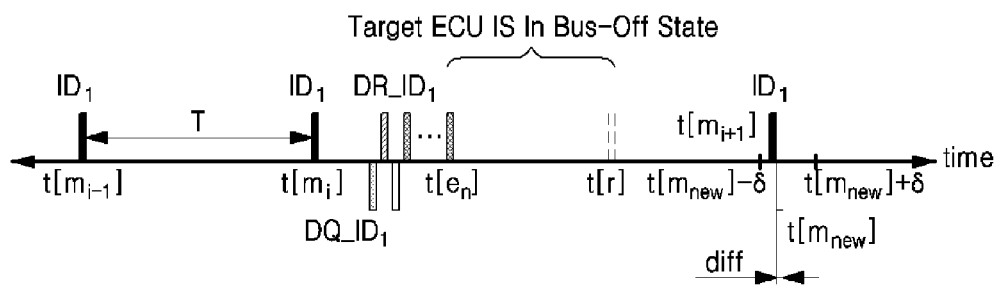
FIGS. 5A and 5B are diagrams for illustrating a compromised-ECU identification method according to at least one exemplary embodiment of the present disclosure.
Figure 5B:
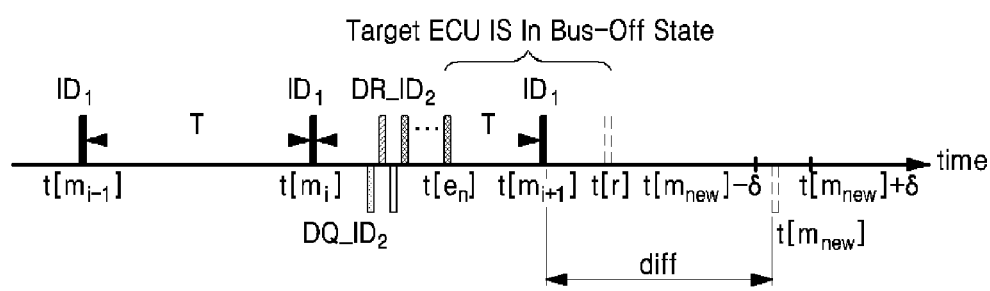

FIGS. 5A and 5B are diagrams for illustrating a compromised-ECU identification method according to at least one exemplary embodiment of the present disclosure. As shown in FIG. 5A, if the identification target ECU is a compromised ECU, that is, once the error generating unit 200 transitioned the compromised ECU to the bus-off state, following recovery of the compromised ECU from the bus-off state, the compromised ECU resumes the transmission of the attack CAN message at the retransmission time ($t[m_{new}]$) calculated by the calculation unit 230. On the other hand, as shown in FIG. 5B, if the identification target ECU is not a compromised ECU, that is, once the error generating unit 200 transitioned an ECU other than the compromised ECU to the bus-off state, the compromised ECU may be configured to transmit the attack CAN message on the CAN bus regardless of the retransmission time ($t[m_{new}]$) calculated by the calculation unit 230.

On this account, the compromised-ECU identification unit 240 according to at least one exemplary embodiment may be configured to determine whether the identification target ECU is a compromised ECU based on whether the attack CAN message is transmitted at the retransmission time ($t[m_{new}]$) calculated by the calculation unit 230. Specifically, the compromised-ECU identification unit 240 may be configured to identify the identification target ECU as being a compromised ECU by comparing the first attack CAN message transmission time ($t[m_{i+1}]$) after the identification target ECU transitions to the bus-off state with the retransmission time ($t[m_{new}]$) calculated by the calculation unit 230.

The compromised-ECU identification unit 240 may be configured to determine that the identification target ECU is a compromised ECU in the situation as shown in FIG. 5A where the first attack message transmission time ($t[m_{i+1}]$) after the identification target ECU transitions to the bus-off state is within a preset threshold time from the retransmission time ($t[m_{new}]$). In other words, in response to determining that a difference, denoted as diff in FIG. 5A, between the first attack CAN message transmission time ($t[m_{i+1}]$) after the identification target ECU transitions to the bus-off state and the retransmission time ($t[m_{new}]$) calculated by the calculation unit 230 is less than or equal to the preset threshold time, the compromised-ECU identification unit 240 may be configured to determine that the identification target ECU is a compromised ECU.

On the other hand, the compromised-ECU identification unit 240 may be configured to determine that the identification target ECU is not a compromised ECU in the situation as shown in FIG. 5B where a difference, denoted as diff in FIG. 5B, between the first attack CAN message transmission time ($t[m_{i+1}]$) after the identification target ECU transitions to the bus-off state and the retransmission time ($t[m_{new}]$) calculated by the calculation unit 230 is greater than the preset threshold time.

Figure 6A:
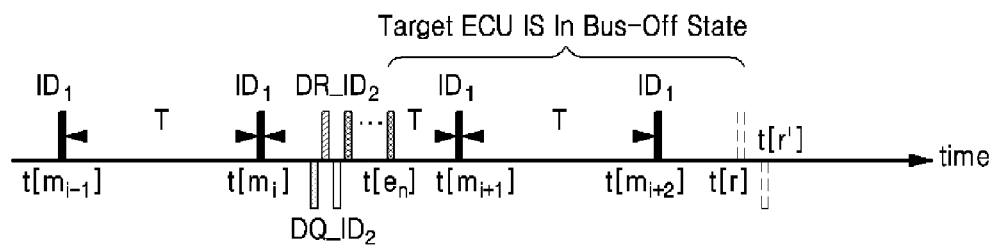
FIGS. 6A and 6B are diagrams for illustrating a compromised-ECU identification method according to another exemplary embodiment of the present disclosure.
Figure 6B:
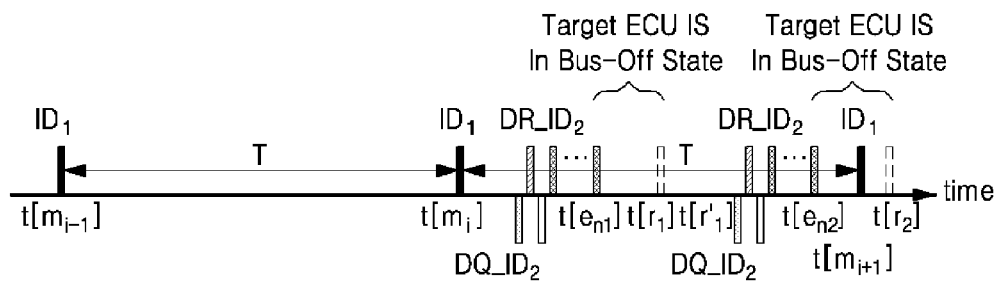

FIGS. 6A and 6B are diagrams for illustrating a compromised-ECU identification method according to another exemplary embodiment of the present disclosure. if the identification target ECU is a compromised ECU, that is, once the error generating unit 200 transitioned the compromised ECU to the bus-off state, the compromised ECU does not transmit the attack CAN message on the CAN bus until the compromised ECU recovers from the bus-off state. On the other hand, as shown in FIG. 6A, if the identification target ECU is not a compromised ECU, that is, once the error generating unit 200 transitioned an ECU other than the compromised ECU to a bus-off state, the compromised ECU may be configured to transmit an attack CAN message on the CAN bus irrespective of the recovery of the identification target ECU. In a particular case of an attack CAN message being injected onto the CAN bus at a fast cycle, the attack CAN message may be transmitted more than once on the CAN bus before the identification target ECU recovers from the bus-off state.

On this account, the compromised-ECU identification unit 240 according to another exemplary embodiment may be configured to determine whether the identification target ECU is a compromised ECU based on whether the attack CAN message is transmitted before the recovery time ($t[r']$) calculated by the calculation unit 230. Specifically, in response to determining that the first attack CAN message transmission time ($t[m_{i+1}]$) after the identification target ECU transitions to the bus-off state precedes the recovery time ($t[r']$), the compromised-ECU identification unit 240 may be configured to determine that the identification target ECU is not a compromised ECU.

As shown in FIG. 6B, according to another exemplary embodiment of the present disclosure, to identify a compromised ECU that transmits an attack CAN message at a period longer than the Wait Time of the identification target ECU or to increase the reliability of identification of the compromised-ECU, the error generating unit 200 prevent the transmission of the CAN message by the identification target ECU for a period greater than the transmission period of the attack CAN message by repeatedly transitioning the identification target ECU to the bus-off state for a certain time or longer and/or a certain number of times or more. Then, the compromised-ECU identification unit 240 may take this opportunity while the identification target ECU is in the bus-off state to identify whether the identification target ECU is a compromised ECU according to detection or non-detection of an attack CAN message on the CAN bus.

According to at least one exemplary embodiment of the present disclosure, in response to determining that the identification target ECU is not a compromised ECU, the compromised-ECU identification unit 240 may be configured to transmit control information for causing the error generating unit 200 and the calculation unit 230 to perform the compromised-ECU identification process for other ECUs.

Figure 7:
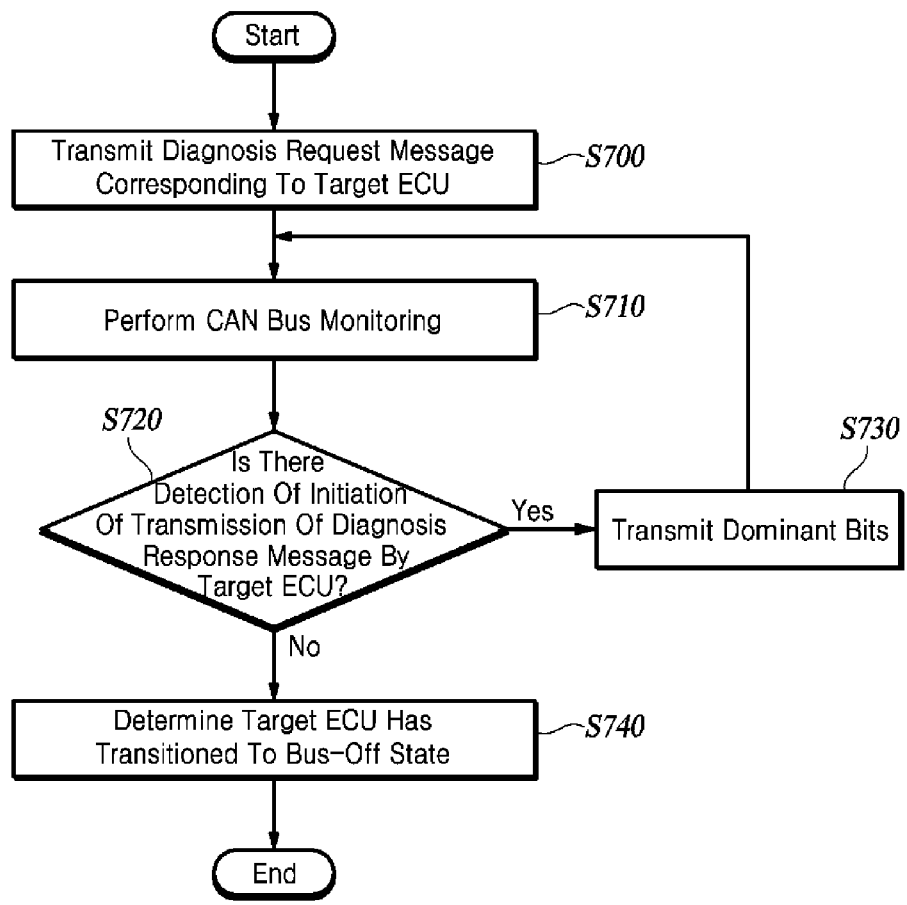
FIG. 7 is a flowchart of a method of transitioning an ECU to a bus-off state according to at least one exemplary embodiment of the present disclosure.

FIG. 7 is a flowchart of a method of transitioning an ECU to a bus-off state according to at least one exemplary embodiment of the present disclosure. The ECU identification apparatus 120 may be configured to transmit a diagnosis request message corresponding to the target ECU on the CAN bus (S700). In particular, the target ECU refers to an analysis target ECU to transition to a bus-off state for parameter analysis, or an identification target ECU to transition to a bus-off state to check whether that ECU is a compromised ECU.

The ECU identification apparatus 120 may be configured to monitor the CAN bus (S710) and detect the initiation of transmission of the diagnosis response message by the target ECU (S720). The ECU identification apparatus 120 may be configured to detect the diagnosis response ID corresponding to the target ECU on the CAN bus and thereby detect the initiation of transmission of the diagnosis response message by the target ECU. The ECU identification apparatus 120 may be configured to transmit a plurality of dominant bits to the CAN bus in response to the detection of the initiation of transmission of the diagnosis response message (S730). For example, the ECU identification apparatus 120 may be configured to transmit six consecutive dominant bits on the CAN bus. Accordingly, the target ECU may be configured to detect a bit error.

The ECU identification apparatus 120 may be configured to monitor the CAN bus (S710) and re-detect the initiation of transmission of the diagnosis response message by the target ECU (S720). The ECU identification apparatus 120 may be configured to transmit a plurality of dominant bits to the CAN bus in response to the re-detection of the initiation of transmission of the diagnosis response message (S730). The ECU identification apparatus 120 repeats Steps S710 to S730 until the target ECU transitions to the bus-off state where it can no longer transmit the diagnosis response message. Responsive to no more detection of the initiation of transmission of the diagnosis response message by the target ECU, the ECU identification apparatus 120 may be configured to determine that the target ECU has transitioned to the bus-off state (S740).

Figure 8:
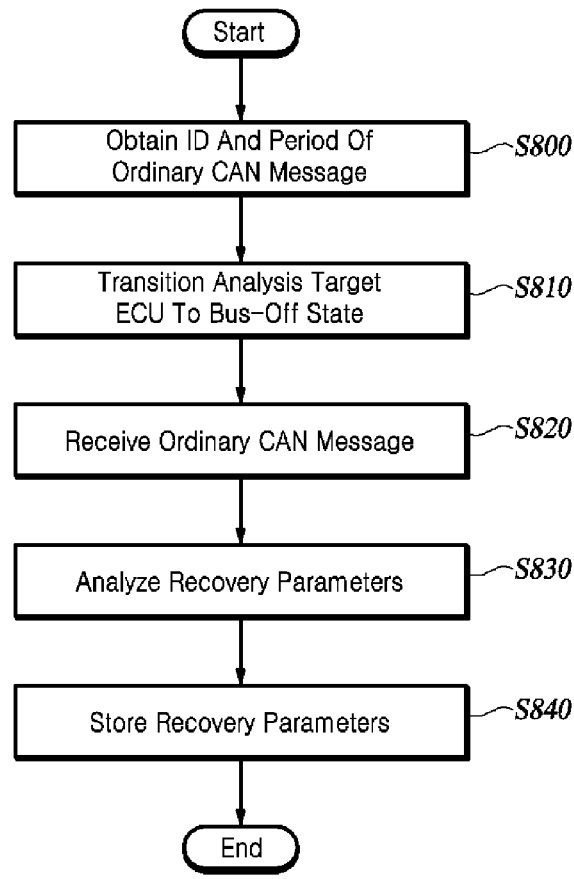
FIG. 8 is a flowchart of a recovery parameter analysis method according to at least one exemplary embodiment of the present disclosure.

FIG. 8 is a flowchart of a recovery parameter analysis method according to at least one exemplary embodiment of the present disclosure. The ECU identification apparatus 120 may be configured to monitor the CAN bus and obtains the ID of an ordinary CAN message transmitted by the analysis target ECU and the period of the ordinary CAN message (S800). The ECU identification apparatus 120 may be configured to transition the analysis target ECU to a bus-off state (S810). The ECU identification apparatus 120 may be configured to monitor the CAN bus to receive the ordinary CAN message that is resumed to be transmitted following the recovery of the analysis target ECU from the bus-off state. As the analysis target ECU recovers from the bus-off state, the ECU identification apparatus 120 may be configured to receive an ordinary CAN message again (S820).

The ECU identification apparatus 120 may be configured to analyze the recovery parameters of the analysis target ECU (S830). For example, the ECU identification apparatus 120 may be configured to analyze the recovery parameters including a Wait Time, a Controller Recovery Type, and a Timer Behavior of the analysis target ECU based on at least one of the time when the analysis target ECU last transmitted the CAN message before it transitioned to the bus-off state, the time when the analysis target ECU transmitted the first CAN message after recovery from the bus-off state, and the time when the analysis target ECU transitioned to the bus-off state. The ECU identification apparatus 120 may be configured to store the analyzed recovery parameters (S840). The ECU identification apparatus 120 may be configured to nontransiently store the recovery parameters by associating them with the analysis target ECU.

Figure 9:
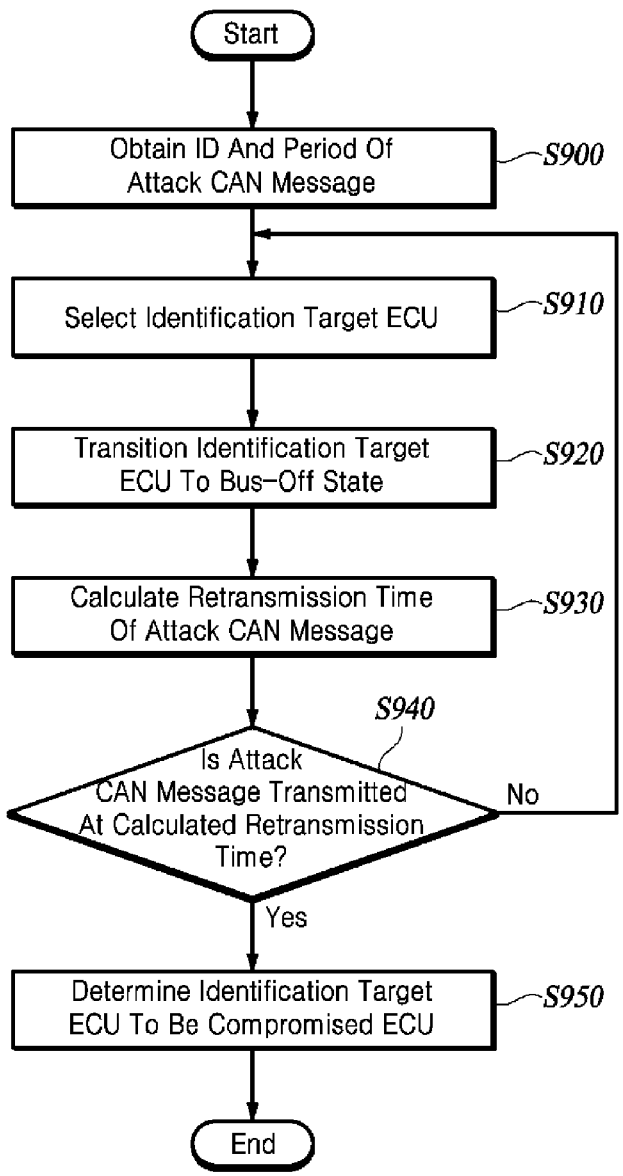
FIG. 9 is a flowchart of a compromised-ECU identification method according to at least one exemplary embodiment of the present disclosure.

FIG. 9 is a flowchart of a compromised-ECU identification method according to at least one exemplary embodiment of the present disclosure. The ECU identification apparatus 120 may be configured to obtain the ID of the attack CAN message and the transmission period of the attack CAN message (S900). According to at least one exemplary embodiment of the present disclosure, in response to the IDS 110 detecting an attack, the ECU identification apparatus 120 may be configured to receive identification initiation information, including the ID of the attack CAN message and the transmission period of the attack CAN message, from the IDS 110. According to another exemplary embodiment of the present disclosure, in response to the IDS 110 detecting an attack, the ECU identification apparatus 120 may be configured to receive the identification initiation information from the IDS 110 and thereafter directly monitor the CAN bus to obtain the ID and the transmission period of the attack CAN message.

The ECU identification apparatus 120 may be configured to select an identification target ECU for a compromised-ECU identification (S910). The ECU identification apparatus 120 may be configured to select an identification target ECU by selecting one of the pre-stored diagnosis request IDs. The ECU identification apparatus 120 may be configured to transition the identification target ECU to the bus-off state (S920).

The ECU identification apparatus 120 may be configured to calculate the retransmission time of the attack CAN message (S930). In other words, the ECU identification apparatus 120 may be configured to assume that the identification target ECU is a compromised ECU that transmits an attack CAN message and calculate a time at which the identification target ECU recovers from the bus-off state and resume transmission of the attack CAN message. The ECU identification apparatus 120 may be configured to calculate the retransmission time of the attack CAN message by using the recovery parameters mapped with the diagnosis request ID.

The ECU identification apparatus 120 may be configured to check whether an attack CAN message is transmitted at the calculated retransmission time (S940). In response to determining that an attack CAN message is transmitted before and/or after a preset threshold time from the calculated retransmission time, the ECU identification apparatus 120 may be configured to determine that the identification target ECU is not a compromised ECU and selects another ECU as the identification target ECU. On the other hand, in response to determining that the attack CAN message is transmitted at a time within the preset threshold time from the calculated retransmission time, the ECU identification apparatus 120 may be configured to determine the identification target ECU to be a compromised ECU (S950).

Figure 10:
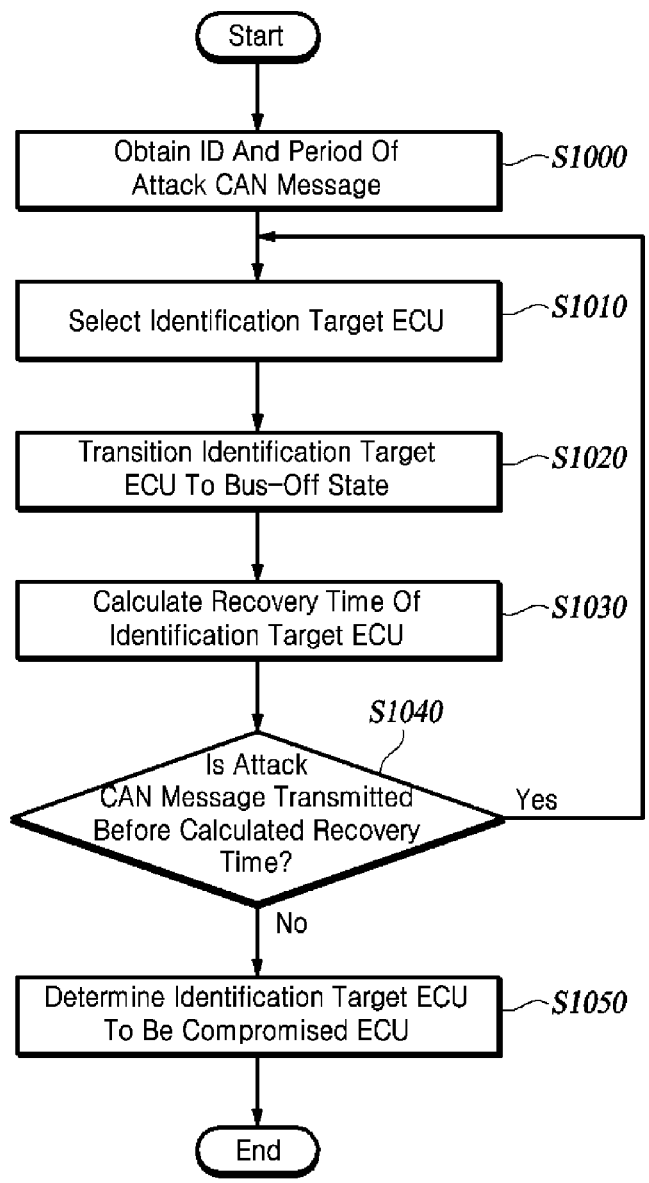
FIG. 10 is a flowchart of a compromised-ECU identification method according to another exemplary embodiment of the present disclosure.

FIG. 10 is a flowchart of a compromised-ECU identification method according to another exemplary embodiment of the present disclosure. Here, since Steps S1000 to S1020 correspond to Steps S900 to S920 of FIG. 9 described above, detailed descriptions thereof will be omitted.

The ECU identification apparatus 120 may be configured to obtain the ID of the attack CAN message and the transmission period of the attack CAN message (S1000). The ECU identification apparatus 120 may be configured to select an identification target ECU for a compromised-ECU identification (S1010). The ECU identification apparatus 120 may be configured to select an identification target ECU by selecting one of the pre-stored diagnosis request IDs. The ECU identification apparatus 120 may be configured to transition the identification target ECU to the bus-off state (S1020).

The ECU identification apparatus 120 may be configured to calculate a recovery time when the identification target ECU is to recover from the bus-off state (S1030). The ECU identification apparatus 120 may be configured to calculate the recovery time by using the recovery parameters mapped with the diagnosis request ID. The ECU identification apparatus 120 may be configured to check whether the attack CAN message is transmitted before the calculated recovery time (S1040). In response to determining that the attack CAN message is transmitted before the calculated recovery time, the ECU identification apparatus 120 may be configured to determine that the identification target ECU is not a compromised ECU and select another ECU as the identification target ECU. On the other hand, in response to determining that no attack CAN message is transmitted before the calculated recovery time, the ECU identification apparatus 120 may be configured to determine the identification target ECU to be a compromised ECU (S1050).

Although the respective steps in FIGS. 7 to 10 are described to be sequentially performed, they merely instantiate the technical idea of some exemplary embodiments of the present disclosure. Therefore, a person having ordinary skill in the pertinent art could incorporate various modifications, additions, and substitutions in practicing the present disclosure by changing the sequence described by FIGS. 7 to 10 or by performing one or more of the steps in FIGS. 7 to 10 in parallel, without departing from the gist and nature of at least one embodiment of the present disclosure, and hence the steps in FIGS. 7 to 10 are not limited to the illustrated chronological sequences.

Various implementations of the system and techniques described herein may be realized by digital electronic circuitry, integrated circuits, field-programmable gate arrays (FPGAs), application-specific integrated circuits (ASICs), computer hardware, firmware, software, and/or their combinations. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The non-transitory computer-readable recording medium includes any type of recording device on which data that can be read by a computer system are recordable. Examples of the non-transitory computer-readable recording medium include non-transitory media such as a ROM, CD-ROM, magnetic tape, floppy disk, memory card, hard disk, optical/magnetic disk, storage devices, and the like and transitory medium such as a carrier wave (e.g., transmission through the Internet) and data transmission medium. Further, the non-transitory computer-readable recording medium may be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

As described above, with the methods and apparatuses of the present disclosure, the CAN protocol's fault confinement mechanisms can be used to identify the ECU performing an attack on the CAN internal network. Therefore, obviating the need for changing the existing CAN protocol, the identification methods and apparatuses of the present disclosure can be applied to currently commercialized vehicles.

Further, the way of identifying a compromised controller according to exemplary embodiments of the present disclosure achieves high scalability over the vehicle lines having the common CAN network configurations and ECUs supposed to follow their common recovery policies.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof

What is claimed is:

1. A method, performed by an electronic device in a controller area network (CAN), for identifying a compromised electronic control unit (ECU) that transmits an attack message on a CAN bus in a periodic transmission cycle, the method comprising:
  in response to detecting the attack message, transitioning a first ECU among a plurality of ECUs connected to the CAN bus to a bus-off state intentionally;
  determining whether the first ECU is the compromised ECU based at least in part on a transmission resumption time, which is predicted from recovery parameters related to the first ECU, for when the first ECU resumes a transmission of a CAN message and a time when the attack message is redetected on the CAN bus;

in response to determining that the difference between the predicted transmission resumption time and the time when the attack message is redetected on the CAN bus is greater than a preset threshold time, transitioning a second ECU different from the first ECU to a bus-off state intentionally; and determining whether the second ECU is the compromised ECU based at least in part on a time, which is predicted from recovery parameters related to the second ECU, for when the second ECU resumes a transmission of a CAN message and a time when the attack message is redetected on the CAN bus.

2. The method of claim 1, wherein the transitioning to the bus-off state comprises:

transmitting a diagnosis request message corresponding to the first ECU;

monitoring the CAN bus to detect an initiation of transmission of a diagnosis response message by the first ECU; and in response to detecting the initiation of transmission of the diagnosis response message, causing a transmission error in the diagnosis response message by transmitting a plurality of dominant bits to the CAN bus until the first ECU transitions to the bus-off state.

3. The method of claim 1, wherein the determining comprises:

predicting, as the predicted transmission resumption time, the time for when the first ECU resumes the transmission of the CAN message by using the recovery parameters related to the first ECU; and determining that the first ECU is the compromised ECU in response to determining that the difference between the predicted transmission resumption time and the time when the attack message is redetected on the CAN bus is less than or equal to the preset threshold time.

4. The method of claim 1, wherein the determining comprises:

calculating, as a calculated recovery time, a time for when the first ECU recovers from the bus-off state by using the recovery parameters related to the first ECU; and determining whether the first ECU is the compromised ECU based on whether the attack message is redetected on the CAN bus before the calculated recovery time.

5. The method of claim 1, wherein the transitioning of the first ECU to the bus-off state comprises:

transitioning the first ECU to the bus-off state repeatedly to prevent the transmission of the CAN message by the first ECU for a period greater than the periodic transmission cycle of the attack message, and wherein the determining comprises:

determining whether the first ECU is the compromised ECU based on whether the attack message is redetected on the CAN bus while the first ECU is in the bus-off state.

6. An electronic device for identifying a compromised electronic control unit (ECU) that transmits an attack message on a controller area network bus (CAN bus) in a periodic transmission cycle, the electronic device comprising:

an error generating unit configured to, in response to detecting the attack message, transition a first ECU among a plurality of ECUs connected to the CAN bus to a bus-off state intentionally; and a compromised-ECU identification unit configured to determine whether the first ECU is the compromised ECU based at least in part on a transmission resumption time, which is predicted from recovery parameters related to the first ECU, for when the first ECU resumes a transmission of a CAN message and a time when the attack message is redetected on the CAN bus;

wherein the error generating unit is further configured to, in response to determining that the difference between the predicted transmission resumption time and the time when the attack message is redetected on the CAN bus is greater than a preset threshold time, transition a second ECU different from the first ECU to a bus-off state intentionally, and wherein the compromised-ECU identification unit is further configured to determine whether the second ECU is the compromised ECU based at least in part on a time, which is predicted from recovery parameters related to the second ECU, for when the second ECU resumes a transmission of a CAN message and a time when the attack message is redetected on the CAN bus.

7. The electronic device of claim 6, wherein the error generating unit is configured to:

transmit a diagnosis request message corresponding to the first ECU, monitor the CAN bus to detect an initiation of transmission of a diagnosis response message by the first ECU, and in response to detecting the initiation of transmission of the diagnosis response message, cause a transmission error in the diagnosis response message by transmitting a plurality of dominant bits to the CAN bus until the first ECU transitions to the bus-off state.

8. The electronic device of claim 6, wherein the compromised-ECU identification unit is configured to:

predict, as the predicted transmission resumption time, the time for when the first ECU resumes the transmission of the CAN message by using the recovery parameters related to the first ECU, and determine that the first ECU is the compromised ECU in response to determining that the difference between the predicted transmission resumption time and the time when the attack message is redetected on the CAN bus is less than or equal to the preset threshold time.

9. The electronic device of claim 6, wherein the compromised-ECU identification unit is configured to:

calculate, as a calculated recovery time, a time for when the first ECU recovers from the bus-off state by using the recovery parameters related to the first ECU; and determine whether the first ECU is the compromised ECU based on whether the attack message is redetected on the CAN bus before the calculated recovery time.

10. The electronic device of claim 6, wherein the error generating unit is configured to transition the first ECU to the bus-off state repeatedly to prevent the transmission of the CAN message by the first ECU for a period greater than the periodic transmission cycle of the attack message, and the compromised-ECU identification unit is configured to determine whether the first ECU is a compromised ECU based on whether the attack message is redetected on the CAN bus while the first ECU is in the bus-off state.

* * * * *